United States Patent [19]

Tanjo et al.

[11] Patent Number: 5,356,602
[45] Date of Patent: Oct. 18, 1994

[54] PROCESS FOR PREPARING ALUMINUM SULFATE

[75] Inventors: Mitsuo Tanjo, Sendai; Toshio Ashitani, Niihama; Tetsuo Fujita, Niihama; Katsuhiro Sakata, Niihama; Mikitoshi Nakada, Ichihara, all of Japan

[73] Assignee: Sumitomo Chemical Company, Ltd., Osaka, Japan

[21] Appl. No.: 994,645

[22] Filed: Dec. 22, 1992

[30] Foreign Application Priority Data

Dec. 25, 1991 [JP] Japan ............................ 3-342573
Jun. 30, 1992 [JP] Japan ............................ 4-172459

[51] Int. Cl.$^5$ ............................ C01F 7/74; C01B 17/90
[52] U.S. Cl. ............................ 423/128; 423/531; 423/556; 423/DIG. 2
[58] Field of Search ............... 423/556, 531, DIG. 2, 423/128

[56] References Cited

U.S. PATENT DOCUMENTS 3,787,563  1/1974  Kartte et al. .................. 423/531
5,026,535  6/1991  Jonsson et al. ............... 423/531

FOREIGN PATENT DOCUMENTS 50-87985  7/1975  Japan .
32003  2/1983  Japan .......................... 423/531
1284945  1/1987  U.S.S.R. ..................... 423/556

*Primary Examiner*—Michael Lewis
*Assistant Examiner*—Stephen G. Kalinchak
*Attorney, Agent, or Firm*—Birch, Stewart, Kolasch & Birch

[57] ABSTRACT

Aluminum sulfate that is less colored is prepared by adjusting the concentration of hydrogen peroxide in sulfuric acid to 0.1% by weight or less, and contacting the sulfuric acid with an alumina-containing compound.

8 Claims, No Drawings

PROCESS FOR PREPARING ALUMINUM SULFATE

BACKGROUND OF THE INVENTION

1. Field of the Invention

The present invention relates to a process for preparing aluminum sulfate that is less colored from high purity sulfuric acid that is used in the electronic industries. More particularly, the present invention relates to a process for preparing less colored aluminum sulfate from high purity sulfuric acid that is used in the electronic industries, while preventing corrosion of storage tanks and pipings used for sulfuric acid and apparatus used for the preparation of aluminum sulfate.

2. Description of the Related Art

Aluminum sulfate is used as a water-purifying agent for water-supply and factory water or effluent, as a paper-sizing agent or a mordant, in fire-extinguisher, in the production of aluminum compounds or tanning of white leather, as a clarifier of oil and fat, as a catalyst for various reactions, and the like.

In general, aluminum sulfate is prepared by charging sulfuric acid into a reactor made of a material resistant to heat and acids, adding aluminum hydroxide in a stoichiometric or slightly excess amount, heating and reacting them. When solid aluminum sulfate is to be obtained, a concentrated aluminum sulfate solution is poured in a solidification bed and cooled till the solidification is completed, and a mass is comminuted and packaged.

When aluminum sulfate is to be obtained in a liquid form, the concentrated aluminum sulfate solution is diluted in the reactor, poured into a storage tank and cooled.

Some applications of aluminum sulfate require whiteness and clearness. Therefore, the aluminum sulfate solution obtained from the reaction is purified using a filtration apparatus that is precoated with diatomaceous earth, or is contacted with activated carbon to remove coloring materials by adsorption (see, for example, Japanese Patent Kokai Publication No. 87985/1975). In the above process, the organic materials (e.g. humic acid, etc.,) which are included in aluminum hydroxide as the raw material, are removed by filtration and/or adsorption to achieve decoloration.

In recent years, with the quick progress in the electronic industries, and in particular, with the rise in demand for high level processing techniques due to the increase of an integration level in the semiconductor industry, a large amount of high purity sulfuric acid is used in a chemical processing step and a rinsing step.

High purity sulfuric acid is replaced with a new batch in a short cycle to prevent problems caused by contamination with impurities.

Studies have been conducted to use the sulfuric acid that is discharged in a large amount from the electronic industries as the raw material in the preparation of surface acoustic wave resonator. However, it has been found that, when specific waste sulfuric acid discharged from the electronic industries is used, aluminum sulfate is colored yellow, and the yellow color cannot be removed even by the treatment with activated carbon.

SUMMARY OF THE INVENTION

An object of the present invention is to provide a process for preparing colorless aluminum sulfate from sulfuric acid that has been used in the electronic industries.

According to the present invention, there is provided a process for preparing aluminum sulfate comprising the steps of adjusting the concentration of hydrogen peroxide in sulfuric acid to 0.1% by weight or less, preferably from 0.1 to 0.01% by weight, and then contacting the sulfuric acid with an alumina-containing compound.

The concentration of hydrogen peroxide may be adjusted by the removal of hydrogen peroxide from the solution of sulfuric acid or dilution of the solution of sulfuric acid.

DETAILED DESCRIPTION OF THE INVENTION

The sulfuric acid to be used as the raw material in the process of the present invention is one Containing more than 0.1% of hydrogen peroxide. Such sulfuric acid is a sulfuric acid solution containing hydrogen peroxide that has been added to increase cleaning power and that is discharged from a wafer cleaning step, wherein sulfuric acid is used for removing atomic state impurities, or from a resist-removing step in the IC production process.

Sulfuric acid that is discharged from the wafer-cleaning or resist-removing steps contains usually at least 0.2% by weight, often about 0.2 to about 5% by weight of hydrogen peroxide, though the hydrogen peroxide concentration varies depending on the factories, the product to be treated with sulfuric acid, and the like.

The concentration of the sulfuric acid is usually at least 50% by weight, more generally from about 70 to about 90% by weight, though it varies depending on the steps in which sulfuric acid is used.

In the process of the present invention, sulfuric acid is reacted with a alumina-containing compound (e.g. aluminum hydroxide). This reaction is an exothermic reaction. In an industrial process, the heat of dilution is used as the heat necessary at the start of the reaction. When the concentration of sulfuric acid is about 70% by weight or more, no heat source may not be necessary in the reactor. Accordingly, sulfuric acid discharged from the above steps and having a concentration of about 70% by weight or more is satisfactorily used as the raw material for the preparation of aluminum sulfate. When the concentration of sulfuric acid is less than about 70% by weight, the sulfuric acid is reacted in a reactor having a heat source.

In the process of the present invention, the concentration of hydrogen peroxide in sulfuric acid is adjusted to less than 0.1% by weight. Any method that can reduce the concentration of hydrogen peroxide to less than 0.1%by weight may be used without limitation. For example, sulfuric acid is contacted with activated carbon; hydrogen peroxide is reduced by the addition of a reducing agent (e.g. sodium thiosulfate, sodium sulfite, sulfurous acid, hydrazine, etc.) in sulfuric acid and stirring; hydrogen peroxide is decomposed in the presence of a noble metal catalyst (e.g. Pt, Pd, Ag, etc.) and a catalyst (e.g. $MnO_2$, $Al_2O_3$, $Fe^{3+}$, $Cu^{2+}$, $Zn^{2+}$, etc.); or hydrogen peroxide is oxidatively decomposed with an oxidizing agent.

Alternatively, sulfuric acid containing hydrogen peroxide in a low concentration, or none at all, is added to sulfuric acid containing hydrogen peroxide in a high concentration to lower the concentration of hydrogen peroxide of the latter to within the desired range.

In addition, hydrogen peroxide is removed from sulfuric acid to a certain concentration and then sulfuric acid is diluted with sulfuric acid having the low hydrogen peroxide concentration, or vice versa.

Sulfuric acid containing hydrogen peroxide at the adjusted concentration is reacted with the alumina-containing compound by a per se conventional method for the preparation of aluminum sulfate, and the reaction mixture is optionally diluted with water to adjust the concentration of aluminum sulfate, whereby aluminum sulfate of a desired grade can be obtained.

Examples of the alumina-containing compound are aluminum hydroxide that may be prepared by the Bayer method, bauxite, alumstone, aluminum residual ash, and the like. Among them, aluminum hydroxide that is prepared by the Bayer method is preferred, since aluminum sulfate with better quality is obtained.

In the process of the present invention, the concentration of hydrogen peroxide in sulfuric acid is adjusted just before the reaction of sulfuric acid with the alumina-containing compound. If sulfuric acid containing hydrogen peroxide in a high concentration is reacted with the alumina-containing compound, and the resultant aluminum sulfate is treated with the activated carbon, the resultant aluminum sulfate cannot be decolored.

The reason why aluminum sulfate is colored by the hydrogen peroxide contained in sulfuric acid has not been clarified, but may be assumed as follows:

A trace amount of titanium compound that is contained in the alumina-containing compound such as aluminum hydroxide will react with the hydrogen peroxide contained in sulfuric acid to form a coloring material, such as a complex of peroxotitanic acid.

When the titanium compound is present in the alumina-containing compound in an amount of at least about 0.0005% by weight, in general at least about 0.001% by weight, a yellow color develops significantly.

In the present invention, the concentration of hydrogen peroxide in sulfuric acid is preferably from 0.1 to 0.01% by weight. In order to prevent coloring of the aluminum sulfate, a lower concentration of hydrogen peroxide in the sulfuric acid is preferred. When the concentration of hydrogen peroxide is 0.1% by weight, the degree of coloring of aluminum sulfate is within a tolerance limit when visually inspected. When the concentration of hydrogen peroxide is 0.01% or higher, an anticorrosion effect is maintained, so that inexpensive general stainless steel, such as austenite type general stainless steel (e.g. SUS 304, 316, etc.), ferrite type general stainless steel (e.g. SUS 405, 430, etc.), two-phase stainless steel (e.g. SUS 329 J1, SUS 329 J2L, etc.), can be used as the material for the container and other apparatus.

Hydrogen peroxide itself is colorless and does not color sulfuric acid, even when its concentration is several percent. Therefore, it may be contemplated that, in general, when sulfuric acid that is discharged from electronic device production processes is reacted with the alumina-containing compound to obtain aluminum sulfate, the coloring material is caused by the organic material contained in the alumina-containing compound, and that such material can be removed by the treatment with activated carbon. However, such treatment does not materially decolor aluminum sulfate.

According to the present invention, it has been found that hydrogen peroxide in sulfuric acid is a cause for coloration of aluminum sulfate, and that when the concentration of hydrogen peroxide is less than 0.1% by weight, industrially valuable aluminum sulfate that suffers from no substantial coloration can be obtained, whereby a huge amount of sulfuric acid discharged from the electronic device production processes can be used effectively.

PREFERRED EMBODIMENTS OF THE INVENTION

The present invention will be illustrated by the following Examples, which do not limit the scope of the present invention.

The properties of sulfuric acid and aluminum sulfate are measured by the following methods:

Purity

Purity is measured by a neutralization titration method according to JIS K1322-1987.

Fe content (%)

The Fe content is measured by a sulfuric acid analysis method according to JIS K1322-1987.

Color (b-value)

A b-value is measured according to JIS Z8722-1982 "Measurement of Color of Objects" using a color-difference meter Z-1001 DP (manufactured by Nippon Denshoku Kogyo Co., Ltd.).

Hydrogen peroxide concentration (%)

The hydrogen peroxide concentration is measured by a peroxotitanic acid method.

EXAMPLE 1

The sulfuric acid concentration, purity and color (b-value) of sulfuric acid that is available from a semiconductor manufacturer were measured. The results are shown in Table 1.

For comparison, those of commercially available sulfuric acid (available from Dowa Mining Co., Ltd., having a purity of 98% or higher) were also measured. The results are also shown in Table 1.

TABLE 1

| Sample No. | 1 (Factory A) | 2 (Factory B) | 3 (Factory C) | 4 (Comparison) |
|---|---|---|---|---|
| Purity (%) | 70.0 | 72.9 | 74.2 | >98.0 |
| Fe (%) | <0.001 | <0.001 | <0.001 | 0.003 |
| Color (b-value) | 0.07 | 0.22 | 0.15 | 0.15 |
| Hydrogen peroxide (%) | 1.9 | 1.3 | 1.0 | <0.06 |

Each of Sample Nos. 1–4 (each 500 g) and activated carbon powder (TAIKO KASSEITAN (trade name) manufactured by Nimura Chemical Industries, Co., Ltd.) (50 g) were charged into a beaker equipped with a stirrer and stirred at 20° C., 200 rpm for one hour.

The color and hydrogen peroxide concentration of the treated sulfuric acid were measured. The results are shown in Table 2.

To aluminum hydroxide (C-31 (trade name) manufactured by Sumitomo Chemical Company, Ltd.), the treated sulfuric acid sample was added and reacted in an amount so that an $Al_2O_3$ content in the resultant aluminum sulfate was 8% by weight.

The color of obtained aluminum sulfate is shown in Table 2.

The resultant aluminum sulfate (100 g) and the same activated carbon powder as used in the above (5 mg) were charged into a beaker equipped with a stirrer and stirred at 20° C., 200 rpm for 30 minutes. The color of the treated aluminum sulfate was measured. The result is also shown in Table 2.

TABLE 2

| Sample No. | Sulfuric acid after treatment | | Aluminum sulfate solution | | Aluminum sulfate solution after treatment |
|---|---|---|---|---|---|
| | Color (b-value) | $H_2O_2$ (%) | Color (b-value) | $H_2O_2$ (%) | Color (b-value) |
| 1 | 5.97 | <0.06 | 2.38 | <0.06 | 0.50 |
| 2 | 7.21 | <0.06 | 2.50 | <0.06 | 0.73 |
| 3 | 6.42 | <0.06 | 2.48 | <0.06 | 0.78 |
| 4 | 5.53 | <0.06 | 2.23 | <0.06 | 0.27 |

As seen from the above results, when the sulfuric acid solution was treated with activated carbon so that the $H_2O_2$ content that causes coloration was decreased, aluminum sulfate prepared from the treated sulfuric acid had a decreased color (b-value), and aluminum sulfate treated with activated carbon had a further decreased color (b-value). From these results, it is understood that the coloring of the aluminum sulfate solution was due to organic materials that were contained in aluminum hydroxide and could be removed with activated carbon.

EXAMPLE 2

In the same manner as in Example 1, except that sodium sulfite (manufactured by Wako Junyaku Co., Ltd.) (100 g) was used in place of activated carbon, sulfuric acid of Sample No. 1 was treated. The color and hydrogen peroxide content of treated sulfuric acid were measured. The results are shown in Table 3.

In the same manner as in Example 1, but using the above treated sulfuric acid, aluminum sulfate was prepared and its color and hydrogen peroxide content were measured. Further, the aluminum sulfate solution was treated with activated carbon in the same manner as in Example 1. The color of the obtained aluminum sulfate solution was measured. The result is shown Table 3.

TABLE 3

| Sample No. | Sulfuric acid after treatment | | Aluminum sulfate solution | | Aluminum sulfate solution after treatment |
|---|---|---|---|---|---|
| | Color (b-value) | $H_2O_2$ (%) | Color (b-value) | $H_2O_2$ (%) | Color (b-value) |
| 1 | 1.58 | <0.06 | 1.61 | <0.06 | 1.20 |

COMPARATIVE EXAMPLE

In the same manner as in Example 1, except that untreated sulfuric acid was used in the preparation step of aluminum sulfate, aluminum sulfate was prepared and its color was measured. The result is shown in Table 4.

Obtained aluminum sulfate (50 g) and activated carbon powder (TAIKO KASSEITAN (trade name) manufactured by Nimura Chemical Industries, Co., Ltd.) (50 g) were charged into a beaker equipped with a stirrer and stirred at 20° C., 200 rpm for one hour. The color of treated aluminum sulfate is shown in Table 4.

TABLE 4

| Sample No. | Color of untreated aluminum sulfate | Color of treated aluminum sulfate |
|---|---|---|
| 1 | 5.5 | 5.2 |
| 2 | 5.8 | 5.4 |
| 3 | 5.8 | 5.2 |
| 4 | 5.2 | 0.1 |

EXAMPLE 3

Through a column having an inner diameter of 25 mm and a length of 160 mm which was filled by granular activated carbon having a BET specific surface area of 471 m²/g and a center diameter of 2.6 mm, Sample No. 1 sulfuric acid (the same as used in Example 1) (170 g) was flowed at a flow rate of 3.75 ml/min. (a space velocity SV of 2.87 hr$^{-1}$). A concentration of hydrogen peroxide in treated sulfuric acid was decreased to 0.27%.

Commercially available sulfuric acid (Sample No. 4) (330 g) was mixed with the treated sulfuric acid to obtain diluted sulfuric acid (500 g) containing 0.09% of hydrogen peroxide and 88.5% of sulfuric acid.

To commercially available aluminum hydroxide (C-31 (trade name) manufactured by Sumitomo Chemical Co., Ltd.) (50 g), diluted sulfuric acid was added and reacted in an amount that an $Al_2O_3$ content in produced aluminum sulfate was 8% by weight. The color of obtained aluminum sulfate is shown in Table 5.

Obtained aluminum sulfate (100 g) and activated carbon powder (TAIKO KASSEITAN (trade name) manufactured by Nimura Chemical Industries, Co., Ltd.) (15 mg) were charged in a beaker equipped with a stirrer and stirred at 20° C., 200 rpm for 30 minutes. The color of treated aluminum sulfate is shown in Table 5.

TABLE 5

| $H_2O_2$ content after dilution with commercially available sulfuric acid | Untreated aluminum sulfate | | Color of treated aluminum sulfate |
|---|---|---|---|
| | Color (b-value) | $H_2O_2$ (%) | |
| 0.09% | 3.02 | <0.06 | 0.45 |

EXAMPLE 4

A sample strip of stainless steel (SUS 316 L) (a length of 25 mm, a width of 20 mm, a thickness of 2 mm) was dipped in 250 mm of sulfuric acid containing hydrogen peroxide in a concentration shown in Table 6 at 30° C., and a corrosion rate (g/m².hr) (namely a dissolved amount per 1 m² in 1 hour) after 168 hours was measured. The results are shown in Table 6.

TABLE 6

| Concentration of sulfuric acid (%) | Concentration of $H_2O_2$ (%) | Corrosion rate (g/m² · hr) |
|---|---|---|
| 60 | 0.00 | 8.996 |
| | 0.01 | 0.002 |
| | 0.04 | 0.002 |
| 70 | 0.00 | 3.314 |
| | 0.01 | 0.003 |
| | 0.04 | 0.003 |
| 80 | 0.00 | 1.382 |
| | 0.01 | 0.003 |
| | 0.04 | 0.003 |

TABLE 6-continued

| Concentration of sulfuric acid (%) | Concentration of $H_2O_2$ (%) | Corrosion rate (g/$m^2 \cdot$ hr) |
|---|---|---|
| >98 | 0.00 | 0.003 |

EXAMPLE 5

In the same manner as in Example 4 except that a sample strip of each stainless steel shown in Table 7 was dipped in 70% sulfuric acid containing 0.01 or 0.04% of hydrogen peroxide, the corrosion rate was measured. The results are shown in Table 7.

TABLE 7

| $H_2O_2$ concent- ration | Stainless steel sample | | | | |
|---|---|---|---|---|---|
| | 304 | 316 | 329 J1 | 430 | 329 J2L |
| 0.01 | 0.001 | 0.001 | 0.001 | 0.004 | 0.001 |
| 0.04 | 0.003 | 0.001 | 0.001 | 0.005 | 0.002 |

What is claimed is:

1. A process for preparing aluminum sulfate from sulfuric acid having more than 0.1% by weight of hydrogen peroxide, comprising the steps of (a) adjusting the concentration of hydrogen peroxide in said sulfuric acid to 1.1% by weight or less by a step selected from the group consisting of reducing hydrogen peroxide in said sulfuric acid by the addition of sodium sulfite, sodium thiosulfate, sulfurous acid, or hydrazine, decomposing hydrogen peroxide in said sulfuric acid in the presence of a catalyst, and oxidatively decomposing hydrogen peroxide in said sulfuric acid with an oxidizing agent, and (b) contacting said sulfuric acid having an adjusted concentration with an alumina-containing composition selected from the group consisting of aluminum hydroxide, bauxite, and alumstone.

2. The process according to claim 1, wherein said concentration of hydrogen peroxide in sulfuric acid is adjusted to 0.1 to 0.01% by weight.

3. The process according to claim 1, wherein said alumina-containing compound is aluminum hydroxide that is prepared by the Bayer method.

4. The process according to claim 1, wherein the concentration of hydrogen peroxide in sulfuric acid is adjusted from 0.1–5.0% by weight to 0.1–0.01% by weight.

5. A process for preparing aluminum sulfate from sulfuric acid having more than 0.1% by weight of hydrogen peroxide, comprising the steps of (a) adjusting the concentration of hydrogen peroxide in said sulfuric acid to 0.1% by weight or less by removing hydrogen peroxide in said sulfuric acid with activated carbon, and (b) contacting said sulfuric acid having an adjusted concentration with an alumina-containing composition selected from the group consisting of aluminum hydroxide, bauxite and alumstone.

6. The process according to claim 5, wherein said concentration of hydrogen peroxide in sulfuric acid is adjusted to 0.1 to 0.01% by weight.

7. The process according to claim 5, wherein said alumina-containing compound is aluminum hydroxide that is prepared by the Bayer method.

8. The process according to claim 5, wherein the concentration of hydrogen peroxide in sulfuric acid is adjusted from 0.1–5.0% by weight to 0.1–0.01% by weight.

* * * * *

UNITED STATES PATENT AND TRADEMARK OFFICE
CERTIFICATE OF CORRECTION

PATENT NO. : 5,356,602
DATED : October 18, 1994
INVENTOR(S) : Mitsuo TANJO, Toshio ASHITANI, Tetsuo FUJITA, Katsuhiro SAKATA & Mikitoshi NAKADA It is certified that error appears in the above-indentified patent and that said Letters Patent is hereby corrected as shown below:

In claim 1, (column 7, line 28)

Change "acid to 1.1% by weight" to --acid to 0.1% by weight--

Signed and Sealed this

Twenty-eighth Day of November 1995

Attest:

BRUCE LEHMAN

Attesting Officer

Commissioner of Patents and Trademarks